United States Patent

[11] 3,630,580

| [72] | Inventors | Charles E. Grawey<br>Peoria;<br>Robert N. Stedman, Chillicothe, both of Ill. |
|---|---|---|
| [21] | Appl. No. | 48,285 |
| [22] | Filed | June 22, 1970 |
| [45] | Patented | Dec. 28, 1971 |
| [73] | Assignee | Caterpillar Tractor Co.<br>Peoria, Ill. |

[54] CUSHIONED TRACK WITH LATERAL RESTRAINING MEANS
20 Claims, 13 Drawing Figs.

[52] U.S. Cl. ..................................................... 305/19, 152/228
[51] Int. Cl. ...................................................... B62d 65/16
[50] Field of Search........................................... 152/228, 225, 219, 56; 180/9.2; 305/19

[56] References Cited
UNITED STATES PATENTS

| 2,917,095 | 12/1959 | Galanot.......................... | 305/19 |
| 2,687,759 | 8/1954 | Keinanen ....................... | 152/228 |
| 3,179,145 | 4/1965 | Weier............................. | 152/228 |

*Primary Examiner*—James B. Marbert
*Attorney*—Fryer, Tjensvold, Feix, Phillips & Lempio ABSTRACT: A resilient spacer means, such as a pneumatic rubber tire, has a circumferentially disposed groove formed on the periphery thereof. An endless track assembly is entrained around the tire and comprises a plurality of closely coupled ground-engaging track shoes connected together by two annular and articulated link assemblies positioned on opposite sides of the tire. Restraining means are secured to the shoes to engage the tire groove to restrain relative lateral movements therebetween.

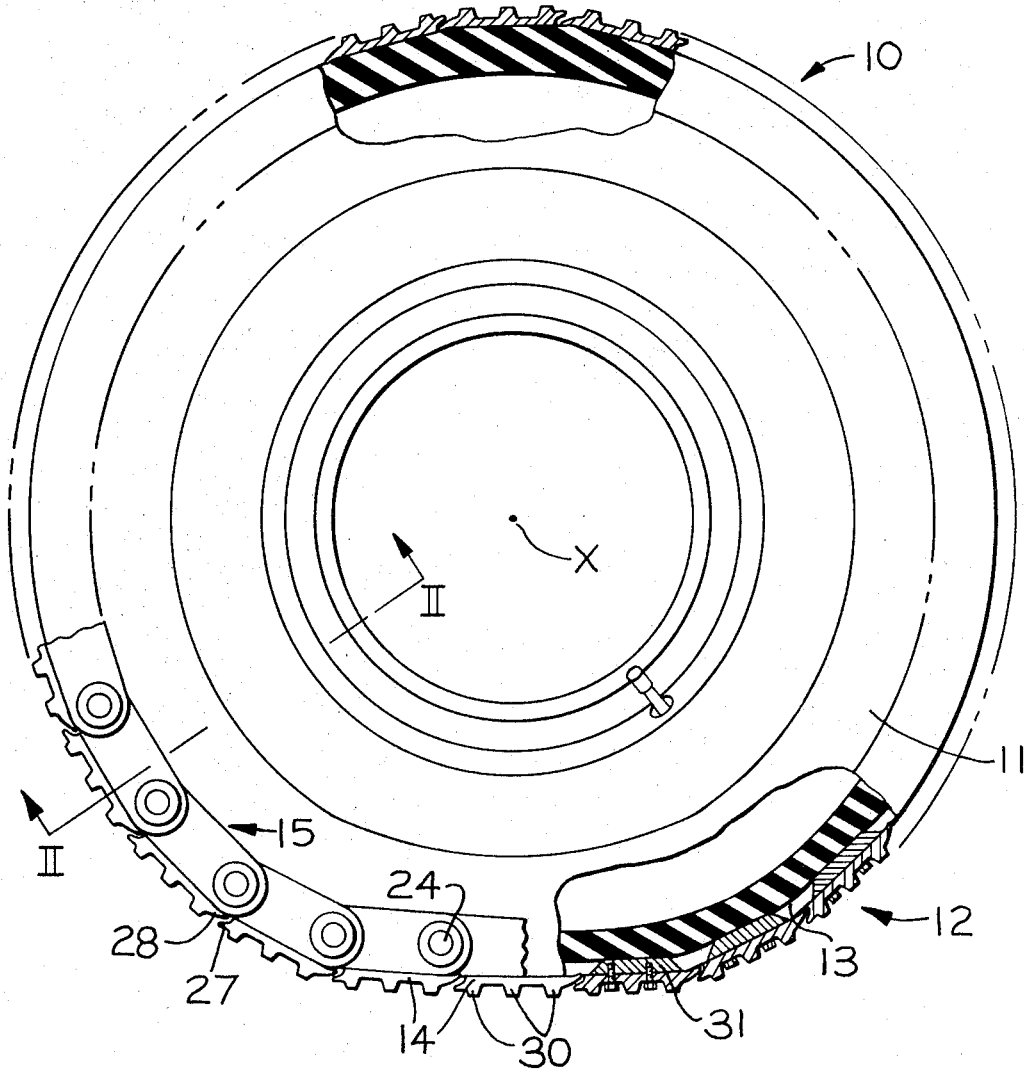

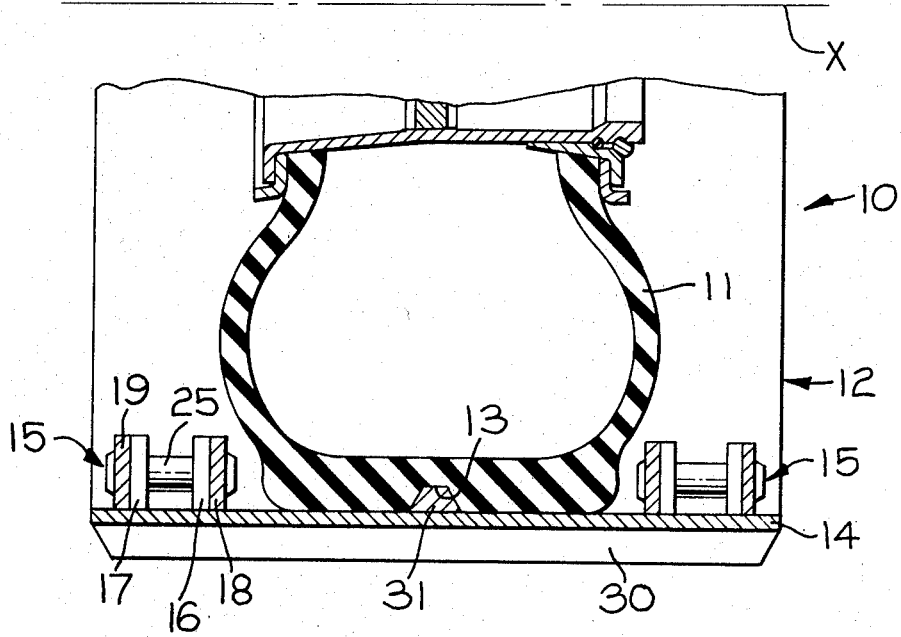
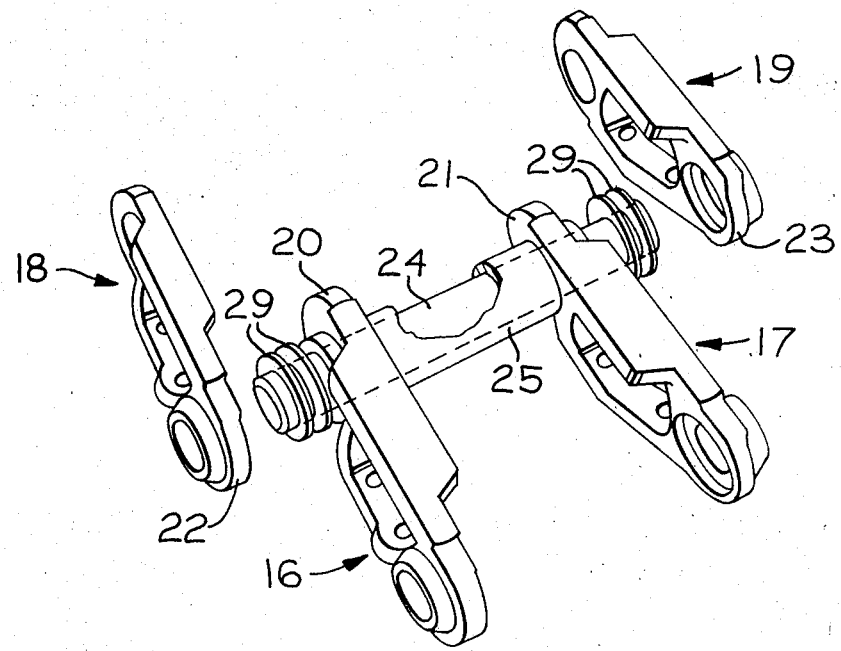

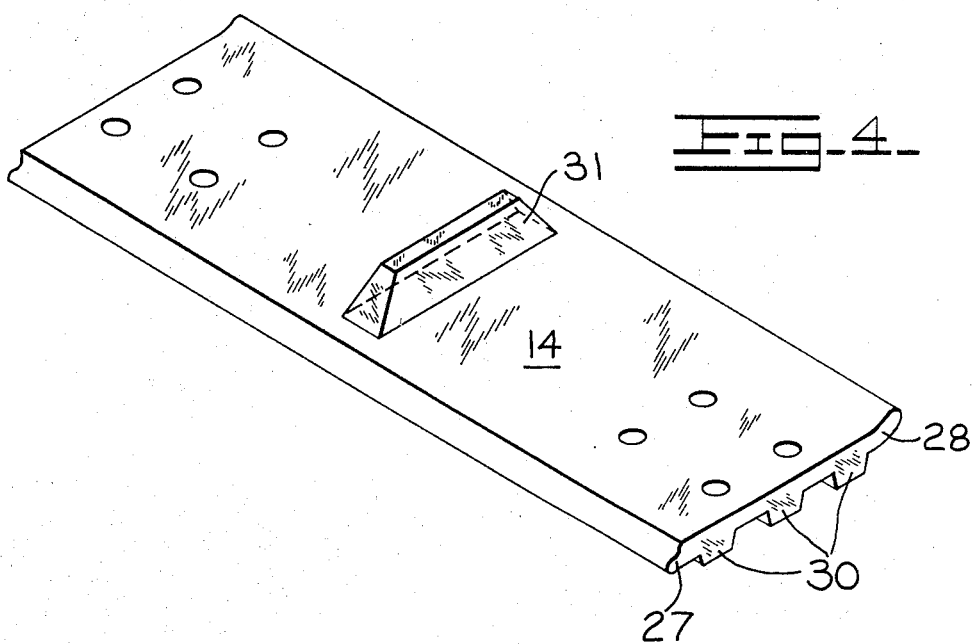
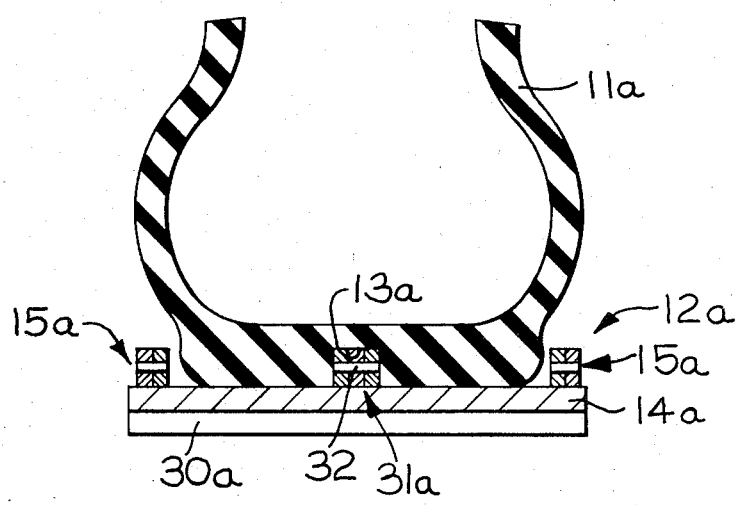

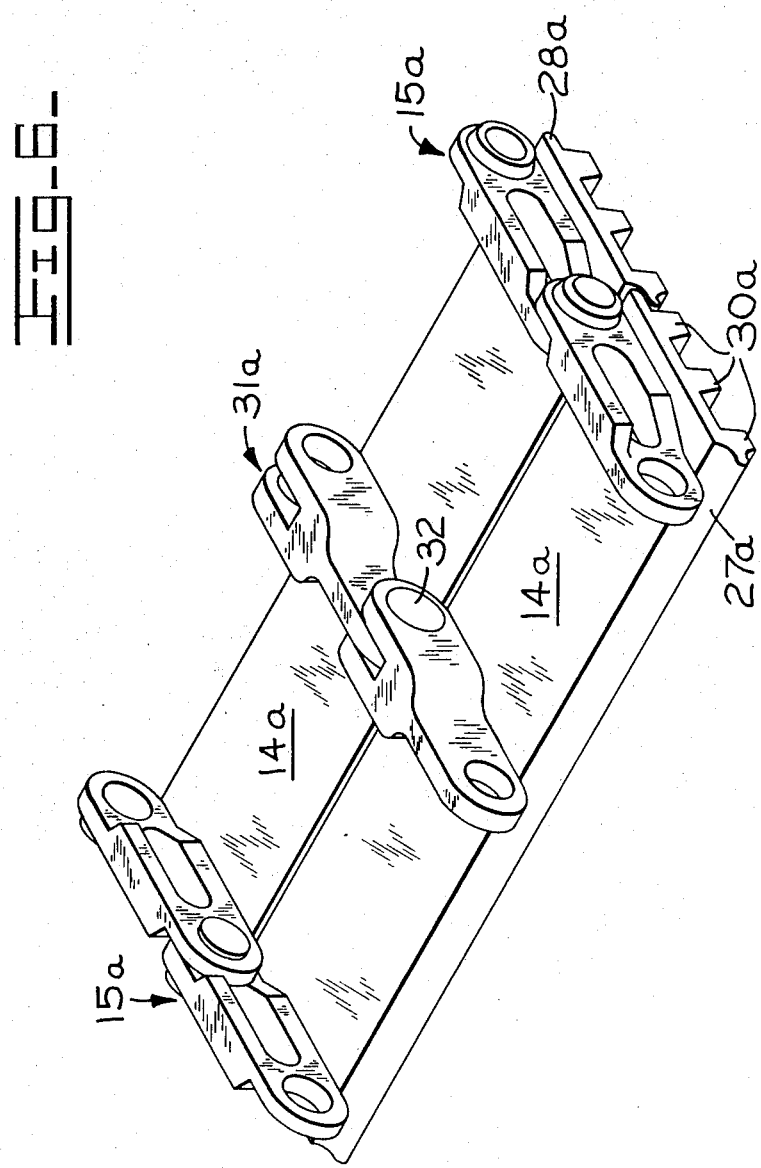

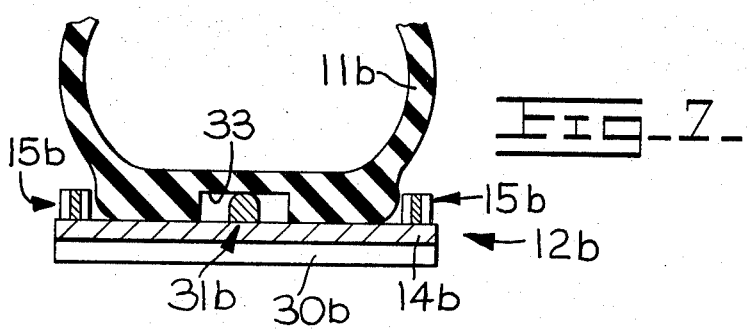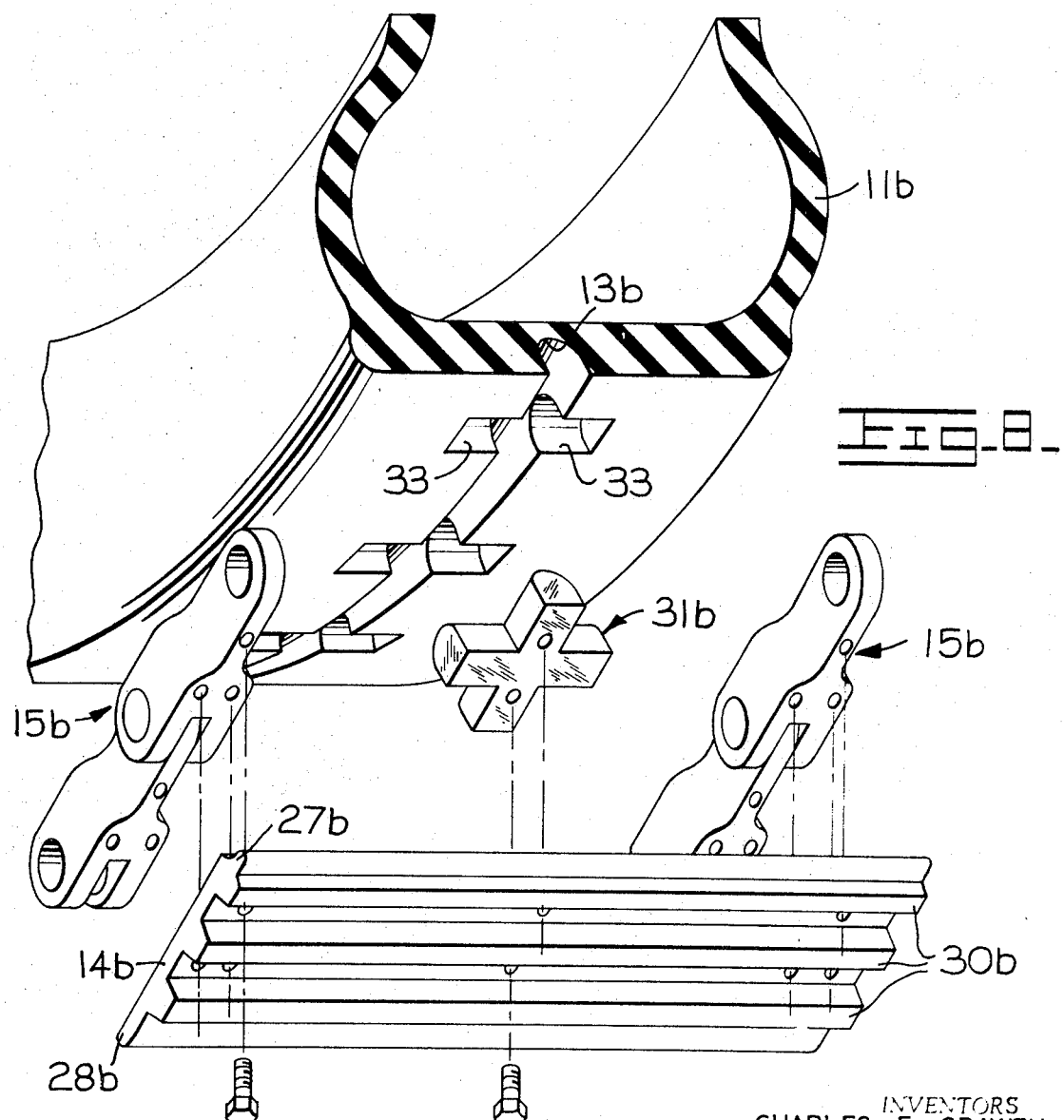

INVENTORS
CHARLES E. GRAWEY
ROBERT N. STEDMAN

CUSHIONED TRACK WITH LATERAL RESTRAINING MEANS

CROSS-REFERENCE TO RELATED APPLICATION

This application discloses constructions similar to constructions disclosed in U.S. patent application, Ser. No. 884,903, filed on Dec. 15, 1969 by Robert A. Peterson et al. for "Cushioned Track and Method for Driving Same" and assigned to the assignee of this application.

BACKGROUND OF THE INVENTION

This invention relates to a wheel of the cushioned track type which is particularly adapted for use on land vehicles.

Various attempts have been made to protect the rubber tires of conventional earthmoving vehicles against damage by either redesigning the tire or by armouring the tire with an encircling chain-type arrangement. Such tires are particularly prone to wear and damage when operated over sharp gravel or crushed or blasted rock of the type encountered in rock quarries and mines. Such prior art armouring devices generally tend to disadvantageously effect a vehicle's stability, speed capability, load carrying and working capacity and/or structural integrity.

SUMMARY AND OBJECTS OF THIS INVENTION

An object of this invention is to overcome the above, briefly described problems by providing a cushioned track exhibiting high degrees of structural integrity and working efficiency. The cushioned track comprises an annular resilient spacer means mounted for rotation about its central axis and an endless track assembly mounted completely around the spacer means. The track assembly comprises a plurality of ground-engaging track shoes and annular connecting means attached to the shoes to closely couple them together. Restraining means, secured to the track assembly, engage a continuous or interrupted circumferential groove formed on the spacer means to restrain lateral movements therebetween in the direction of the central, rotational axis of the spacer means.

BRIEF DESCRIPTION OF THE DRAWINGS

Other objects of this invention will become apparent from the following description and accompanying drawings wherein:

FIG. 1 is a partially sectioned, side elevational view of a cushioned track embodiment of this invention;

FIG. 2 is a sectional view taken in the direction of arrows II—II in FIG. 1;

FIG. 3 is an exploded, isometric view of a portion of a link assembly employed in a track assembly of the FIGS. 1 and 2 cushioned track embodiment;

FIG. 4 is an enlarged isometric view of a track shoe employed in the FIGS. 1 and 2 track assembly;

FIG. 5 is a sectional view, similar to FIG. 2, but showing another cushioned track embodiment;

FIG. 6 is an enlarged, isometric view illustrating a portion of a track assembly employed in the FIG. 5 cushioned track embodiment;

FIG. 7 is a sectional view, similar to FIGS. 2 and 5, but illustrating another cushioned track embodiment;

FIG. 8 is an enlarged and exploded isometric view of the FIG. 7 cushioned track embodiment.

DESCRIPTION OF THE PREFERRED EMBODIMENTS

Figure 9:
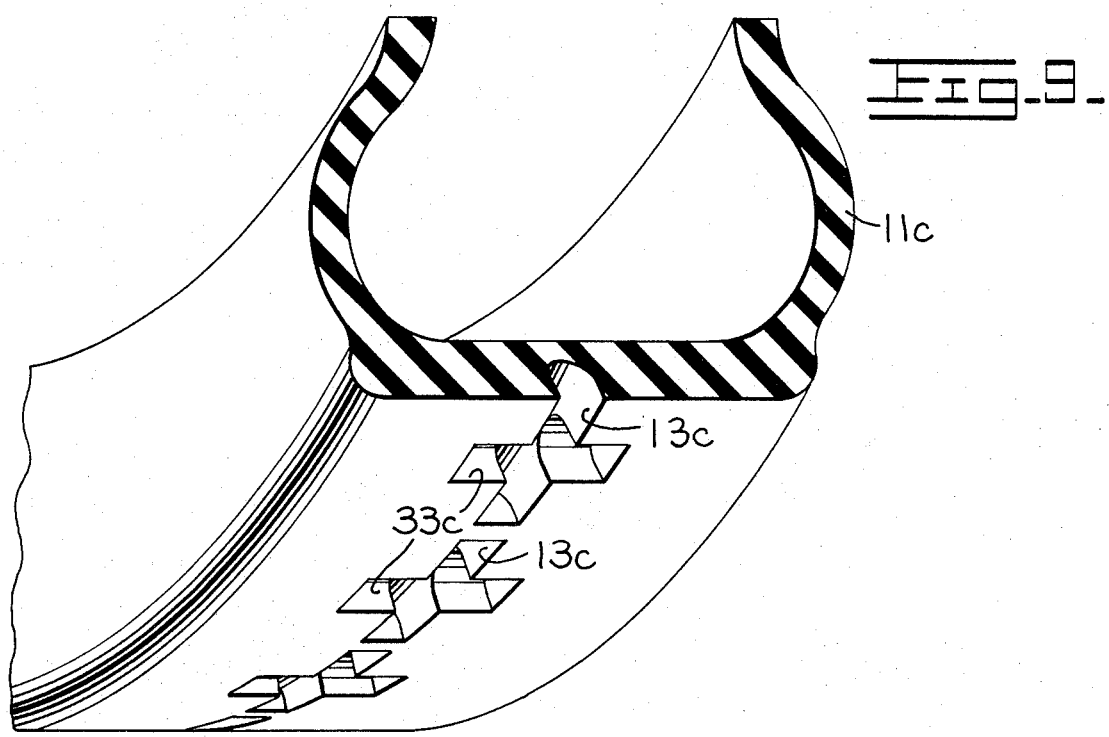
FIGS. 9-13 are isometric views each illustrating a further restraining means embodiment capable of use with the cushioned tracks of this invention.

FIGS. 1–4 illustrate a first cushioned track embodiment 10 adapted to replace conventional tires or the like employed on standard earthmoving equipment, such as wheel-type tractors. The cushioned track comprises an annular resilient spacer means 11 having a substantially annular and polygonal-shaped endless track assembly 12 mounted completely therearound.

The resilient spacer means may comprise an air-inflated rubber tire or air bag, for example, mounted on a conventional rim assembly. Other suitable types of spacer means are disclosed in above-referenced U.S. patent application, Ser. No. 884,903.

The rim may be suitably connected to a vehicle's drive axle (not shown) to be driven and rotated about a central axis X thereof by an internal-combustion engine (not shown). The illustrated tire spacer means embodiment may be of standard construction comprising suitably integrated interliner, body plies and tread plies. A continuous groove 13 may be premolded or otherwise suitably formed on the tread portion or periphery of the tire to extend circumferentially relative to rotational axis X.

Although one circumferentially continuous groove is shown, it should be understood that separated and independent grooves may be formed about the tire if so desired. The groove, shown in FIG. 2 as preferably being laterally disposed intermediate the tire's sidewalls, may be otherwise located thereon in such lateral direction. Also, two or more such grooves may be employed, if so desired.

Endless track assembly 12 comprises a plurality of closely coupled ground-engaging shoes 14 circumferentially surrounding the spacer means. An annular, articulated link assembly or connecting means 15 is positioned on each side of the spacer means. The assemblies may be bolted or otherwise suitably connected to the radially inner surfaces of outboard portions of the shoes to closely couple them together.

The radially inner surface portions of the shoes intimately contact and compress substantially all of the periphery of the spacer means between groove 13 and each connecting means 15. Such periphery thus assumes a substantially circumferentially continuous and polygonal-shaped configuration (FIG. 1) for driving purposes. Such driving relationship is fully described in above-referenced U.S. patent application, Ser. No. 884,903.

Each double link assembly comprises a plurality of laterally spaced first and second pairs of links 16–17 and 18–19, respectively. Each link of each pair of links overlaps and adjacent link of an adjacent pair of links so that inner, overlapped first end portions 20 and 21 of the first pair of links 16 and 17, for example, are positioned within outer, overlapping second end portions 22 and 23 of the second pair of links 18–19.

The resulting integrated construction of each link assembly presents substantially smooth and circumferentially continuous inboard surface portions. The link assemblies are preferably positioned in spaced relationship relative to the sidewalls and tread of the spacer means (FIGS. 2). In certain applications, wherein such inboard surface portions of the link assemblies abut the tire's sidewalls, undue surface and rubbing contact may be occasioned therebetween.

Also, such abutting link assemblies may tend to restrict the tire's sidewall bulge which normally occurs when the cushioned track is subjected to a vertically disposed load. A conventional tire carcass, for example, may tend to at least partly envelope the link assemblies to cause a reverse bend in the tire's cords to increase the heat buildup therein and thus reduce the tire's life expectancy. The spaced relationship of the link assemblies, relative to the tire, overcomes the above problems.

Pivot means for pivotally connecting the first end portions of the first pair of links to the second end portions of the second pair of links may comprise a pin 24. The pin extends through the first pair of links and is press-fitted into or otherwise suitably connected to the second end portions 22—23 of the second pair of links. The second pair of links are thus attached together for simultaneous rotation about the longitudinal axis of the pin. A bearing bushing 25 is mounted for limited rotational movement relative to the pin by its press-fit connection to the first end portions 20—21 of the first pair of links.

Referring to FIG. 1, the longitudinal axis of each pin 24 is preferably positioned substantially parallel relative to central axis X and substantially intermediate a respective pair of adjacent shoes 14 connected together thereby. Such an arrangement facilitates a close coupling of the shoes together and also permits them to move into contact with the ground at the formed footprint in a substantially smooth and uninterrupted manner. In addition, the shoes are permitted to completely mask the periphery of the spacer means for protection and antidirt filtration purposes.

It should be further noted in FIG. 1 that first and second lugs 27 and 28 are formed integrally with each shoe, at respective ends thereof. The lugs function in conjunction with the above-described disposition of pin 24 to completely mask each other during rotation of the cushioned track. In particular, first lug 27 of one shoe will substantially cover a second lug 28 of an adjacent shoe to protect the spacer means against damage and to prevent dirt infiltration during all phases of operation. If so desired, conventional sealing means in the form of Belleville-type washers 29 may be mounted at each end of pin 24 for sealing purposes. Although in certain applications the outer surface portions of the track shoes may be smooth and interrupted, i.e., void of grousers, the majority of earthworking applications require at least one grouser for increased traction and related operating purposes. The FIGS. 1 and 4 track shoe 14, for example, employs three grousers 30 disposed parallel to central axis X and extending radially outwardly relative thereto. The grousers extend at least substantially fully across the width of the shoe and are preferably positioned with the outboard grousers closely adjacent to the pivotal connections at pins 24.

Referring to FIGS. 1, 2 and 4, a restraining means 31 is bolted or otherwise suitably secured to shoe 14, midway between the tire's sidewalls and the ends of the shoe. The restraining means may comprise a metallic lug member having the illustrated pyramidal-shape which substantially fully engages the like-shaped groove 13. The restraining means functions to prevent the track assembly from moving laterally in the direction of axis X, relative to spacer means 11, during vehicle operation. Thus the portions of the spacer means adjacent to link assemblies 15 in FIG. 2 may be constantly maintained at least substantially out of contact therewith notwithstanding sidewall bulges that may occur therein.

A lug 31 is preferably secured to radially inner surface portions of each shoe 14 and has a length extending at least one-half of the shoe's width (FIG. 4). As shown, the lug's width is preferably substantially less than its length. Such a construction permits substantially all remaining peripheral portions of spacer means 11, other than groove 13, to intimately contact the inner flat surface portions of the shoes to form the above-discussed polygonal-shaped driving relationship therebetween.

The radial height of each lug and mating groove 13 is shown as approximately one-half of the radial thickness of the spacer means' tread section (FIG. 2) although other suitable relative heights may be employed. In addition, all of the lugs and the groove 13 substantially lie in a plane disposed transversely relative to central axis X. The apexes of the pyramidal-shaped lugs are positioned to point radially inwardly towards such axis.

FIGS. 5 and 6 illustrate another embodiment of the cushioned track teachings of this invention with structures corresponding to those illustrated in FIGS. 1–4 being depicted by like numerals, but with the latter numerals each being accompanied by an $a$. Like numbering is used for the further embodiments of FIGS. 7–13, but with the numerals appearing therein being accompanied by $b$ through $g$.

In FIGS. 5 and 6, a resilient spacer means 11a has a track assembly 12a mounted therearound. The track assembly comprises a plurality of closely coupled track shoes 14a attached together by endless link assemblies 15a mounted outboard of the spacer means. It should be noted that link assemblies 15a may alternatively comprise a plurality of single links (FIG. 6) suitably pivotally connected together substantially intermediate adjacent pairs of track shoes.

Restraining means 31a comprises a plurality of identical fork- and blade-type links. The fork end portion of one link is pivotally connected on the blade end portion of an adjacent link by a pivot pin 32. A continuous groove 13a of rectangular cross section (FIG. 5) is formed on the periphery of spacer means 11a to accommodate the restraining means or link assembly 31a therein.

FIGS. 7 and 8 illustrate another cushioned track embodiment wherein outboard link assemblies 15b are identical to the fork- and blade-type link assembly 31a illustrated in FIG. 6. A continuous groove 13b is formed on the periphery of the tire and is intersected by cross-grooves 33 disposed in substantial parallel relationship relative to the central rotational axis of the cushioned track. A cross-shaped lug member or restraining means 31b is preferably secured to each shoe 14b to have first and second lug portions thereof engage groove 13b and cross-groove 33, respectively. In this embodiment it should be noted that such second lug portions mechanically engage cross-grooves 33 to supplement the tire to track driving capabilities.

FIG. 9 illustrates a modification of the restaining means for the FIGS. 7 and 8 cushioned track wherein a circumferential groove 13c is interrupted. Thus, a plurality of circumferential groove segments 13c equally spaced around a spacer means 11c, are each intersected by a cross-groove 33c. Each groove segment and cross-groove are constructed to fully accommodate the cross-shaped lug member or restraining means 31b of FIG. 8.

Figure 10:
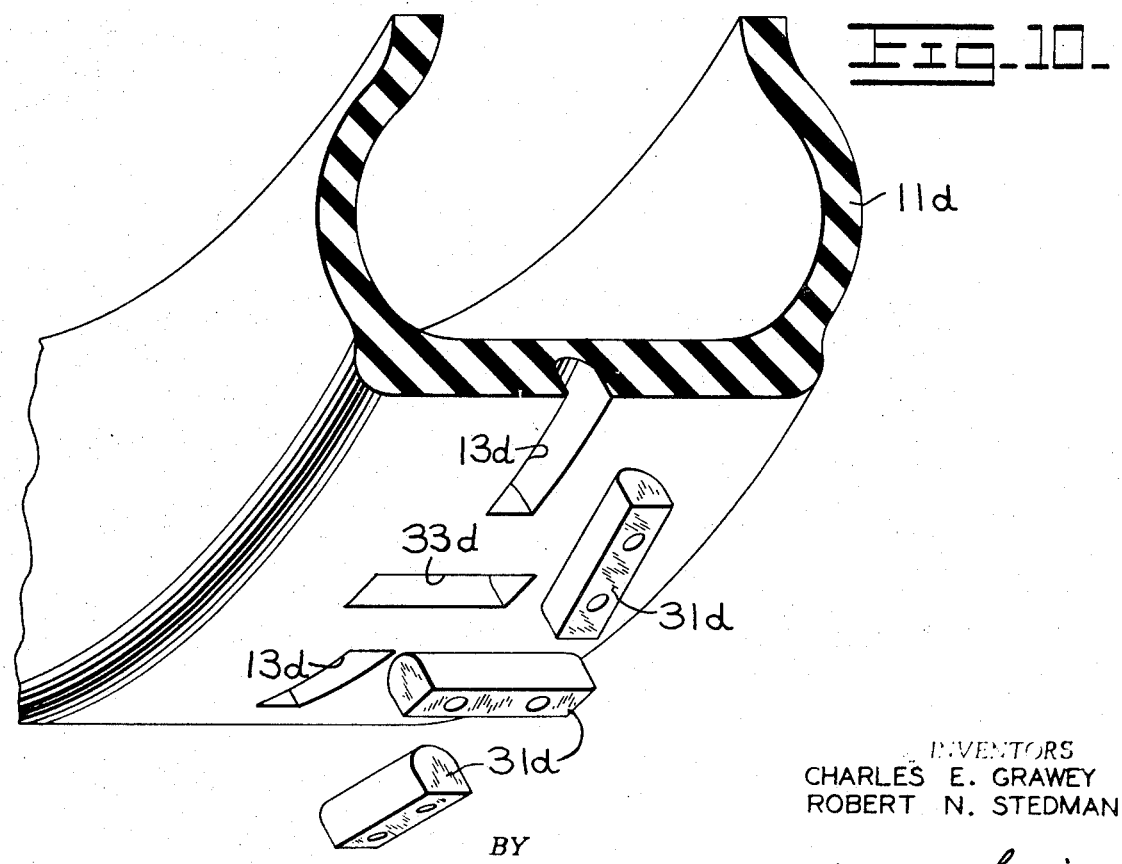

FIG. 10 illustrates a further modification of the restaining means for the FIGS. 7 and 8 cushioned track. In particular, each adjacent pair of equally spaced circumferential groove segments 13d have a transverse or cross-groove 33d positioned therebetween. Identical, elongated lug members 31d- suitably attached to a track shoe (not shown), are fully and individually accommodated in the groove segments formed on the periphery of a spacer means 11d.

Figure 11:
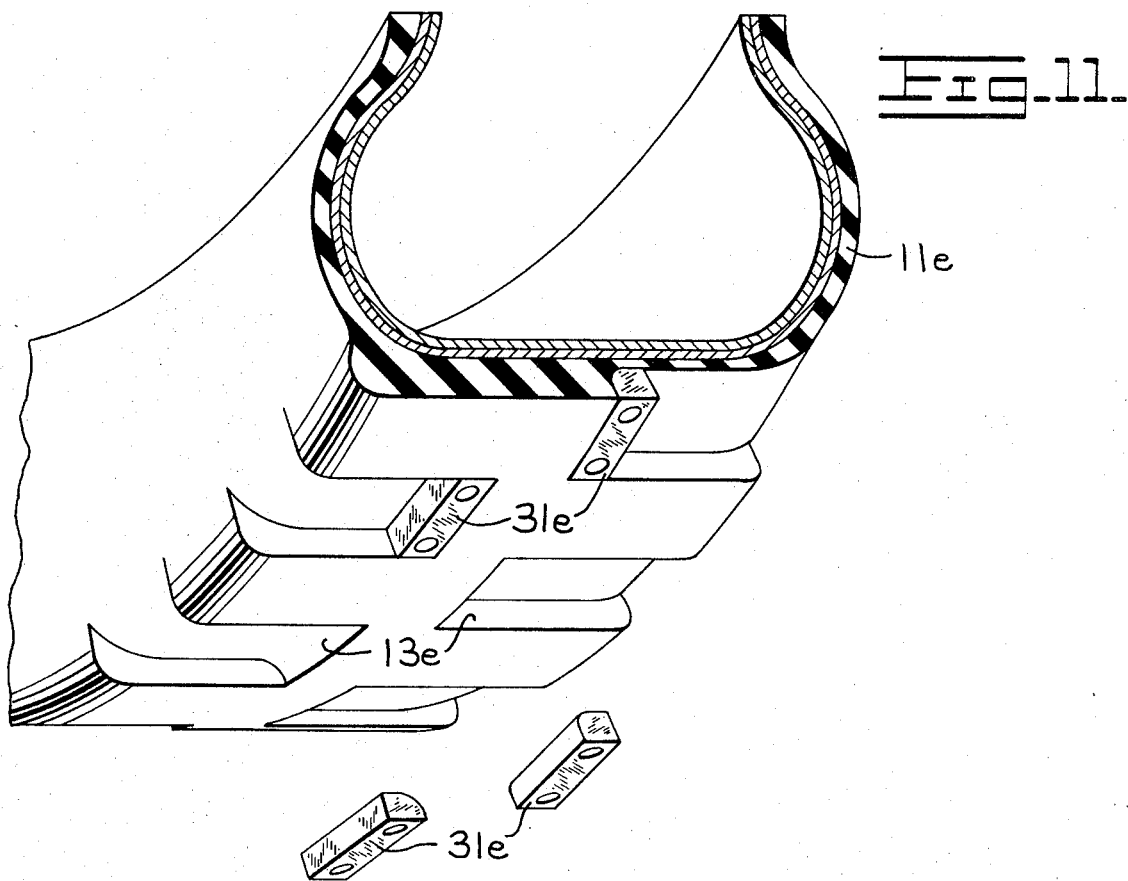

FIG. 11 illustrates a still further modification of the restraining means for the FIGS. 7 and 8 cushioned track. Such modification is similar to the FIG. 10 restraining means in that individual and identical lug members 31 e engage circumferential groove segments 13e formed around spacer means 11e, for lateral restraining purposes. The laterally and circumferentially staggered lug members may be suitably attached to a track shoe (not shown) to extend in the same direction circumferentially about the central axis of the spacer means.

Figure 12:
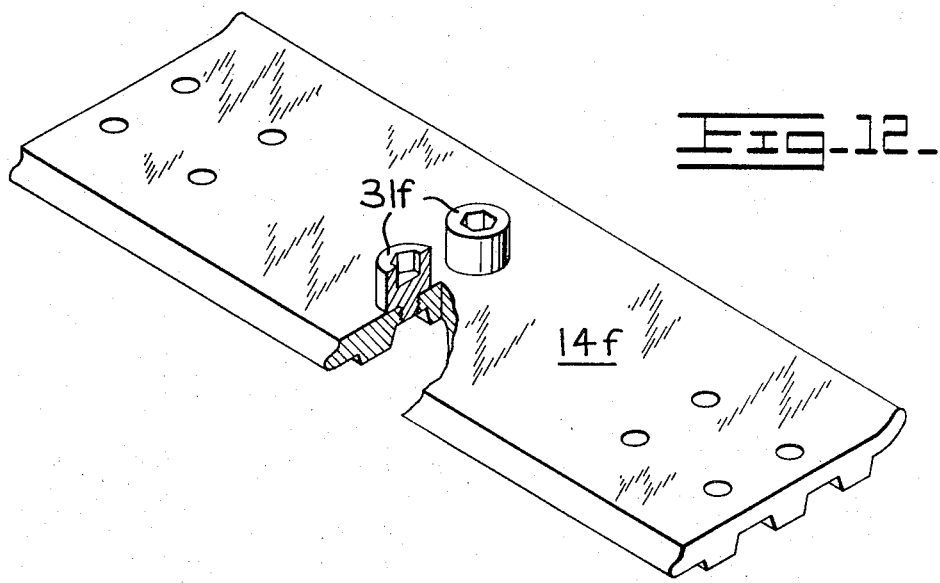
Figure 13:
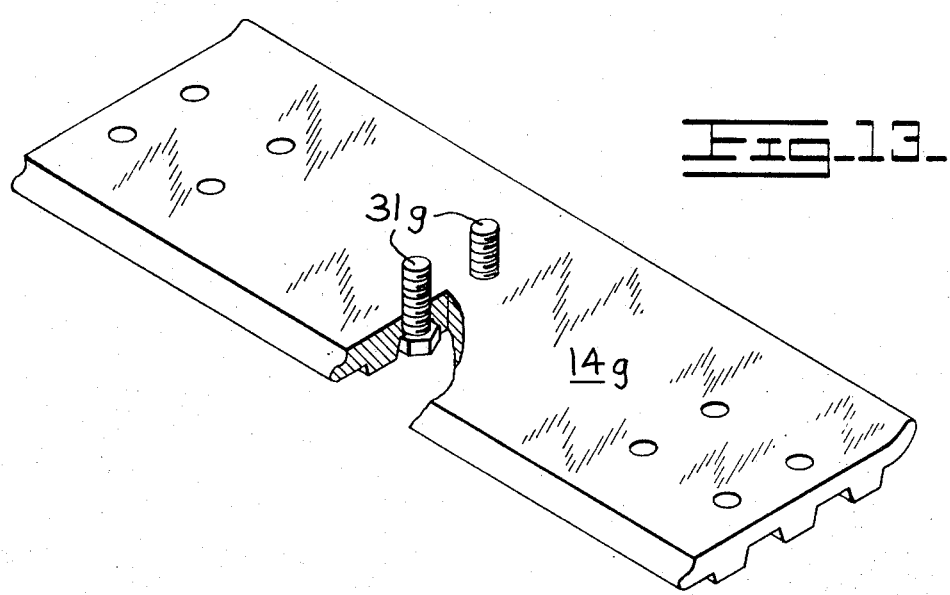

FIGS. 12 and 13 illustrate further restraining means embodiments adapted for use with the FIGS. 1–4 cushioned track, for example. In FIG. 12, annular lugs or bushings 31f are suitably attached by cap screws to a track shoe 14f to replace lug 31 of FIG. 4, for example. The circumferentially disposed lugs will thus engage groove 13 (FIG. 1) to provide lateral restraining means for the integrated cushioned track assembly.

FIG. 13 differs from FIG. 12 in that the lugs comprise the shanks of cap screws or bolts 31g suitably threaded through a track shoe from the outer side thereof. Therefore, the shanks of the screws, or other suitable pins or specially designed lugs, will engage groove 13 for restraining purposes. It should be understood that lugs 31f and 31g could likewise be accommodated in a standard thread design of the spacer means or like-shaped holes could be formed on the spacer means to receive same. Also, various and scattered arrays of such lugs could be employed on the track shoes.

What is claimed is:

1. An annular resilient spacer means mounted for rotation about its central axis and having means forming at least one groove on the periphery thereof, said groove at least partially extending circumferentially about said central axis, an endless track assembly mounted completely around the periphery of said spacer means, said track assembly comprising a plurality of closely coupled ground-engaging shoes circumferentially surrounding said spacer means and annular connecting means attached to said shoes and positioned on opposite sides and exteriorly of said spacer means to closely couple said shoes together, and restraining means secured to said track shoes and engaging said groove to restrain lateral movement of said track assembly relative to said spacer means in the direction of said axis, said restraining means positioned between said connecting means.

2. The invention of claim 1 wherein each of said connecting means comprises an articulated link assembly, each link assembly comprising a plurality of links and pivot means pivotally connecting each circumferentially adjacent pair of links together.

3. The invention of claim 1 wherein said spacer means comprises an air-inflated, rubberlike tire member.

4. The invention of claim 2 wherein each of said link assemblies comprises a plurality of single links with each circumferentially adjacent pair of links being overlapped and connected together by said pivot means.

5. The invention of claim 4 wherein each of said links comprises a fork end portion and an opposite blade end portion, the blade end portion of one link of each adjacent pair of links being pivotally mounted within the fork end portion of the second link thereof.

6. The invention of claim 1 wherein said shoes have widths defining outboard portions extending a substantially equal lateral distance beyond a respective one of said portions, each of said connecting means attached to a respective one of said shoe's outboard portion in spaced relationship relative to a respective one of said portions of said spacer means.

7. The invention of claim 1 wherein the radially inner surface portions of each of said shoes are flat, substantially all of the periphery of said spacer means between said groove and said connecting means being maintained solely in compressed intimate contact with the flat inner surface portions of said shoes to form substantially circumferentially continuous and polygonal-shaped surface contact therewith.

8. The invention of claim 1 wherein at least one grouser is secured to radially outer surface portions of each of said shoes to extend radially outwardly therefrom and away from said central axis.

9. The invention of claim 1 wherein said restraining means solely comprises at least one lug secured to radially inner surface portions of at least some of said shoes and extending a substantial distance across the width thereof transversely relative to said central axis.

10. The invention of claim 9 wherein all of said lugs substantially lie on the said plane, said plane being disposed transversely relative to said central axis, and said lugs being positioned at least substantially midway between opposite lateral sides of said spacer means in the direction of said central axis.

11. The invention of claim 9 wherein each of said lugs and groove are pyramidal shaped with the apexes thereof positioned to point radially inwardly toward said central axis.

12. The invention of claim 9 wherein each of said lugs is cross-shaped and comprises a first lug portion disposed transversely to said central axis and a second lug portion disposed transversely to said first lug portion and further comprising additional means forming another transverse groove on the periphery of said spacer means transversely intersecting said first-mentioned groove for receiving said second lug portion therein.

13. The invention of claim 1 wherein said restraining means solely comprises an articulated link assembly.

14. The invention of claim 12 wherein said first-mentioned groove is circumferentially continuous about said central axis and a plurality of said transverse grooves are equally spaced about said central axis, the second lug portion of a lug being positioned in each of said transverse grooves and the first lug portions of said lugs being positioned in said circumferentially extending groove.

15. The invention of claim 12 wherein said first-mentioned groove comprises a plurality of spaced groove segments circumferentially disposed about said central axis, each of said groove segments intersecting one of said transverse groove to accommodate one of said cross-shaped lugs therein.

16. The invention of claim 9 wherein said groove comprises a plurality of circumferentially spaced groove segments each accommodating one of said lugs therein and further comprising an additional and separate lug positioned between and transversely relative to a pair of adjacent first-mentioned lugs and means forming another transverse groove for accommodating each of said additional lugs.

17. The invention of claim 9 wherein said lugs are staggered laterally and circumferentially relative to said central axis and said groove comprises groove segments with each groove, said lugs all extending in the same direction circumferentially about said central axis.

18. The invention of claim 1 wherein said restraining means comprises at least two circumferentially spaced lugs secured to radially inner surface portions of each of said shoes to engage said groove.

19. The invention of claim 18 wherein each of said lugs comprises annular bushing.

20. The invention of claim 18 wherein each of said lugs comprise the shank of a bolt threadably secured to a respective track shoe.

* * * * *